Patented Mar. 18, 1924.

1,487,471

UNITED STATES PATENT OFFICE.

RUDOLF PLÖNNIS, OF WILMERSDORF, NEAR BERLIN, GERMANY.

WEATHERPROOF COATING MEDIUM.

No Drawing.   Application filed November 3, 1920.   Serial No. 421,527.

*To all whom it may concern:*

Be it known that I, RUDOLF PLÖNNIS, a citizen of the Free State of Prussia, in the German Republic, residing at Wilmersdorf, near Berlin, in the Free State of Prussia, Germany, have invented Improvements in Weatherproof Coating Mediums; and I do hereby declare the following to be a full, clear, and exact description of the same.

My invention relates to weather proof coating media adapted for use as a cement for card board and the like and as a lining for floors or walls and the process of making the same, and the object of the invention is to provide a composition which can be used as a coating for any matter and more particularly for wood, iron, and other metals, and for coatings of cement or other mortar or clay. Another object of the invention is to provide a composition from which fire proof card board or coatings for floors or walls can be made. With these objects in view my invention consists in the features to be described hereinafter and particularly pointed out in the appended claims.

In the practice of my invention I mix potassium waterglass with a certain amount of potassium hydroxid lye (caustic potash lye) and add to the mixture calcium carbonate, chalk or similar matter such as magnesia. The mixture remains for a long time highly fluid, so that it may be spread on a foundation. In some cases I add coloring matter such as mineral color or filling media to the solution.

My improved solutions are especially applicable for use as paint which can be spread on foundations of any character, and which as compared with paint now in use is highly weatherproof and is in a less degree affected by heat and liquids such as acids.

In the manufacture of my improved paint I add for example to potassium water glass of the trade from 2 to 5 per cent of a 50% potash lye (hydroxid of potassium lye) and 5% or more of washed chalk.

In a modification of the process I add tar oil to the solution of potassium water glass, potash lye and chalk, whereby the solution is materially changed according to the amount of tar oil added thereto. The solution adheres more firmly to the foundation, it is less brittle, and it provides a better coating as against rusting than the original composition. I have found that in most cases an addition of from 2 to 10% is sufficient.

Among the tar oils those of petroleum (petroleum driving oil) impart to the solutions certain desirable properties wherefore they are preferred for many purposes as compared to other tar oils such as coal tar oils.

A desirable property of the petroleum tar oil is that it may be mixed more thoroughly with the said solution of potassium water glass, potash lye, chalk, and the like, and that the color of the composition is light and bright. Therefore, I prefer to add petroleum tar oil in such cases in which the color of the composition is of importance apart from the property as an anti-rusting medium, as is the case for example in optical signals.

In addition the coating made from the solution is nearly odorless, as distinguished from compositions made with other tar oils, which property is important for indoor painting as well as for coatings of public vehicles and public buildings.

In most cases an addition of from 2 to 5% of petroleum tar oil to the solution has proved sufficient, though in some cases I prefer a higher ratio.

In the manufacture of fire proof and insulating bodies such as veneer, fabric, card boards, etc., I coat sheets of paper or thin card board with one of the aforesaid solutions or mixtures, and I place the said sheets one upon the other before the coating has dried, so that a body of the desired thickness is obtained, and I bind the sheets together or mould the same by pressure. Thereafter the body is dried. In a similar way I proceed in case of fabric, veneer, or the like.

A card board which has thus been produced can be washed, it is very hard, and it resists high temperatures a longer time than asbestos board impregnated with water glass, because it is a poor conductor of heat.

A further modification of the process consists in adding to a solution of potash lye, potassium water glass and chalk, saw dust, powdered peat, sand, and similar matter, and in some cases dyestuffs. I mix all of the said substances, and spread the same on a suitable foundation such as wood, iron, stone, clay, mortar, etc. Thereby I obtain a coating which has the afore-mentioned valuable properties.

The coating may also be made by spreading on the foundation a mixture of potassium water glass, potash lye, and chalk, and thereafter spreading thereon saw dust, cork meal, powdered peat, sand, and the like, and pressing the same on the coating. Preferably the method is repeated until the coating has the desired thickness, which method is preferable because the coating dries more rapidly. The coating is perfectly fire proof, it is a good insulator as against heat, and when applied to metal for example iron, it prevents oxidation.

I claim:

1. The herein described composition of matter which comprises potassium water glass, caustic alkali and calcium carbonate, and which is adapted for use as a paint or coating for floors and walls.

2. The herein described composition of matter which comprises potassium water glass, caustic alkali, a filling medium and tar oil, and which is adapted for use as a paint or coating for floors and walls.

3. The herein described composition of matter which comprises potassium water glass, caustic alkali, calcium carbonate and tar oil, and which is adapted for use as a paint or coating for floors and walls.

4. The herein described composition of matter which comprises 100 parts by weight of potassium water glass, about 3 parts of caustic alkali and about 5 parts of calcium carbonate, and which is adapted for use as a paint or coating for floors and walls.

5. The herein described composition of matter which comprises 100 parts by weight of potassium water glass, about 3 parts of caustic alkali, about 5 parts of calcium carbonate, and about 5 parts of tar oil, and which is adapted for use as a paint or coating for floors and walls.

In testimony whereof I hereunto affix my signature in the presence of two witnesses.

Dr. RUDOLF PLÖNNIS.

Witnesses:
Dr. ERNEST MÜLLENDORF,
MARIA HOCHREUTER.